United States Patent [19]
Bublitz et al.

[11] 4,007,028
[45] Feb. 8, 1977

[54] ELECTRONICALLY CONTROLLED GLASSWARE-FORMING MACHINE

[75] Inventors: Arthur T. Bublitz, Ann Arbor, Mich.; Gerald A. Jakes, Toledo, Ohio

[73] Assignee: Reliance Electric Company, Pepper Pike, Ohio

[22] Filed: Sept. 30, 1975

[21] Appl. No.: 618,010

[52] U.S. Cl. .................................. 65/163; 65/164; 65/DIG. 13
[51] Int. Cl.[2] .......................................... C03B 9/40
[58] Field of Search ............ 65/160, 161, 162, 163, 65/DIG. 13

[56] References Cited
UNITED STATES PATENTS

| | | | |
|---|---|---|---|
| 3,762,907 | 10/1973 | Quinn et al. | 65/163 X |
| 3,787,196 | 1/1974 | Becker et al. | 65/164 |
| 3,877,915 | 4/1975 | Mylchreest et al. | 65/160 X |
| 3,905,793 | 9/1975 | Croughwell | 65/161 X |

Primary Examiner—Arthur D. Kellogg
Attorney, Agent, or Firm—Louis V. Granger

[57] ABSTRACT

A controlled glassware-forming machine is disclosed which has a plurality of individual machine sections each capable of individually forming glassware. Fluid actuators such as pneumatic pistons and cylinders are connected to move the various machine elements within each of the individual sections. These actuators are used to open and close the molds and to move the invert-revert arms, for example. The initiation of the movement of these machine elements is by way of a plurality of main valves to start and stop the movements. These valves are controlled by solenoids in turn controlled by electronic outputs of a computer or control means. The speed of movement of the machine elements is controlled by variable aperture valves such as needle valves, and a power means is provided to vary the aperture of such needle valves, also controlled by outputs of the computer. The movement of the machine elements actuates control switches, such as limit switches, and these provide feedback to the computer so that the actual position of the machine elements at any given time is provided as an input to the computer. The foregoing abstract is merely a resume of one general application, is not a complete discussion of all principles of operation or applications, and is not to be construed as a limitation on the scope of the claimed subject matter.

17 Claims, 8 Drawing Figures

ELECTRONICALLY CONTROLLED GLASSWARE-FORMING MACHINE

CROSS REFERENCE TO RELATED APPLICATION

This invention incorporates by reference the application Ser. No. 602,245, filed Aug. 6, 1975, entitled Adjustable Valve Assembly now Pat. No. 3,982,726, issued Sept. 28, 1976.

BACKGROUND OF THE INVENTION

The glass industry is an ancient industry; and because so much glass has been used for centuries, this industry was one of the first to mechanize. The discrete parts glass-forming machines have been made by several different companies, but basically they all imitate the centuries old hand forming of glassware merely mechanizing the various steps in the process. Since the discrete parts industry is essentially a process of intermittent motions, yet motions which must be inter-related, the typical individual section machine was one which was powered by pneumatic motors controlled by a multipart valve block. The valve block, in turn, was controlled by a timing drum driven from a line shaft which synchronized all parts of the entire machine.

The glass melting and delivery is to a glass feeder which feeds gobs of molten glass. In the individual section glassware-forming machines a gob distributor distributes these gobs successively in a predetermined order to the different individual sections of the machine. Each section of the machine is capable of independently producing glassware, and the sections of the machine then place such formed glassware on a take-off conveyor. Since the take-off conveyor must have room to accept the formed glassware, it is run at a suitable speed, and the various sections of the machine are operated in the predetermined sequence at a particular phase difference. In a six-section machine, this phase difference would be 60°.

The prior art discrete glassware-forming industry had a productivity percentage of about 40 to 85 percent. By this is meant the number of finished glassware products which passed inspection and which were packaged relative to the number of gobs being cut by the glass feeder was only in the range of 40 to 85 percent. Since glass has the lowest raw material cost and about the highest labor cost of any basic industry, any decrease in the labor content per finished piece makes the product increasingly salable in traditional markets and opens new markets for such glassware products.

Discrete glass-forming machines are started with all glass from the glass feeder being diverted down the cullet chute. This is to maintain uniform glass flow in the delivery section. Next, each individual machine section is brought onto the line. In the prior art this was done by actuating a mechanical clutch or the like so that that machine section started only in its proper phase position. The gob distributor was started to feed the gob to that particular machine section. In a six-section machine, for example, only one of six gobs would be fed to the respective section at start-up and the other five gobs would be diverted down the cullet chute.

In order to get that one machine section properly operating the operator had to set "on" and "off" buttons in a plurality of slots around the periphery of a rotating timing drum for that machine section. Typically, each individual machine section had 21 slots for these buttons which actuated on and off a main valve in turn directing air flow to operate pneumatic motors or actuators for the individual section. Before the timing drum was started, these buttons would be loosened with a wrench, moved to the approximate degree point, and then tightened. However, once the machine was started, the rotating timing drum was a particularly dangerous part of the machine. The operator had to adjust these buttons while they were moving and often only about 90° to 120° of the periphery of the timing drum was available to the operator for this adjustment. A maximum speed for the operation of the timing drum was about 20 RPM for smaller pieces of glassware being formed, so in this case the operator would have only about one second of time to loosen the stop button, try to move it a few degrees and then retighten it, during the available sector of adjustment. Many fingers have been lost by operators who miscalculated the amount of time available for this adjustment. This shows that the degree of resolution which the operator was able to achieve often was only about 3° to 10°, depending on the speed of the drum. A further consideration was the safety of the operator while trying to adjust moving machinery. The U.S. Government has become increasingly concerned with the safety of personnel in manufacturing plants, and this manual of operation of the repositioning of the on and off buttons on the timing drum is causing increased scrutiny by the safety inspectors.

In order to adjust the speed of movement of the various machine parts, the operator had available to him a needle valve which could be manually adjusted, e.g., by a screwdriver slot. This controlled the velocity of air flow in the pneumatic actuator, and hence, controlled the speed of movement of the machine part. Again, this was something which was often adjusted while the machine was in operation in order that the operator could try to accomplish precise velocity control of the machine parts.

Once the operator had all the machine sections in operation, he then tried to speed up the entire machine by increasing the rotational speed of the line shaft, he might then find that he did not have sufficient time for a particular timed travel of a machine element. One reason was because gravity acted on the gobs and parisons with the same force regardless of speed. Another reason is because the heat in the glass had a shorter time in which to be dissipated. He would thus have to readjust the on and off buttons on the rotating timing drum for particular ones of the twenty-one functions for the main valves or have to readjust the needle valves for velocity control. This was not only a safety hazard but was subject to the many variables of human control and was a prime reason why the total productivity of the individual section glassware-forming machine was only about 40 to 85 percent.

The typical I.S. glass machine uses large amounts of cooling air to cool the molds and the glassware at various stages. This cooling air is ambient air which varies in temperature from winter to summer. This is one further reason why continual changes in the settings were required by the operator in order to try to maintain high productivity.

SUMMARY OF THE INVENTION

The invention may be incorporated in a controlled glassware-forming machine comprising, in combination a plurality of individual machine sections each having means to individually form glassware, fluid actuators connected to move the various machine elements of each individual section, a plurality of valve means connected to control movement of said fluid actuators of the glassware-forming machine, control switches actuated by movement of said fluid actuators, and control means having inputs from said control switches and having outputs connected to control said valve meant to control the time of actuation of the various machine elements of each individual section.

An object of the invention is to provide an improved glassware-forming machine wherein the valve means for controlling actuation of the machine elements in the individual section are controlled by a computer.

Another object of the invention is to provide an electronically controlled glassware-forming machine wherein variable apertures of valves controlling various machine elements are controlled by electronic control means.

Another object of the invention is to provide a controllable glassware-forming machine wherein the velocity, and hence, relative timing of the various machine elements of individual machine sections may be easily, safely, and simply controlled.

Other objects and a fuller understanding of the invention may be had by referring to the following description and claims, taken in conjunction with the accompanying drawing.

DESCRIPTION OF THE PREFERRED EMBODIMENTS

Figure 1:
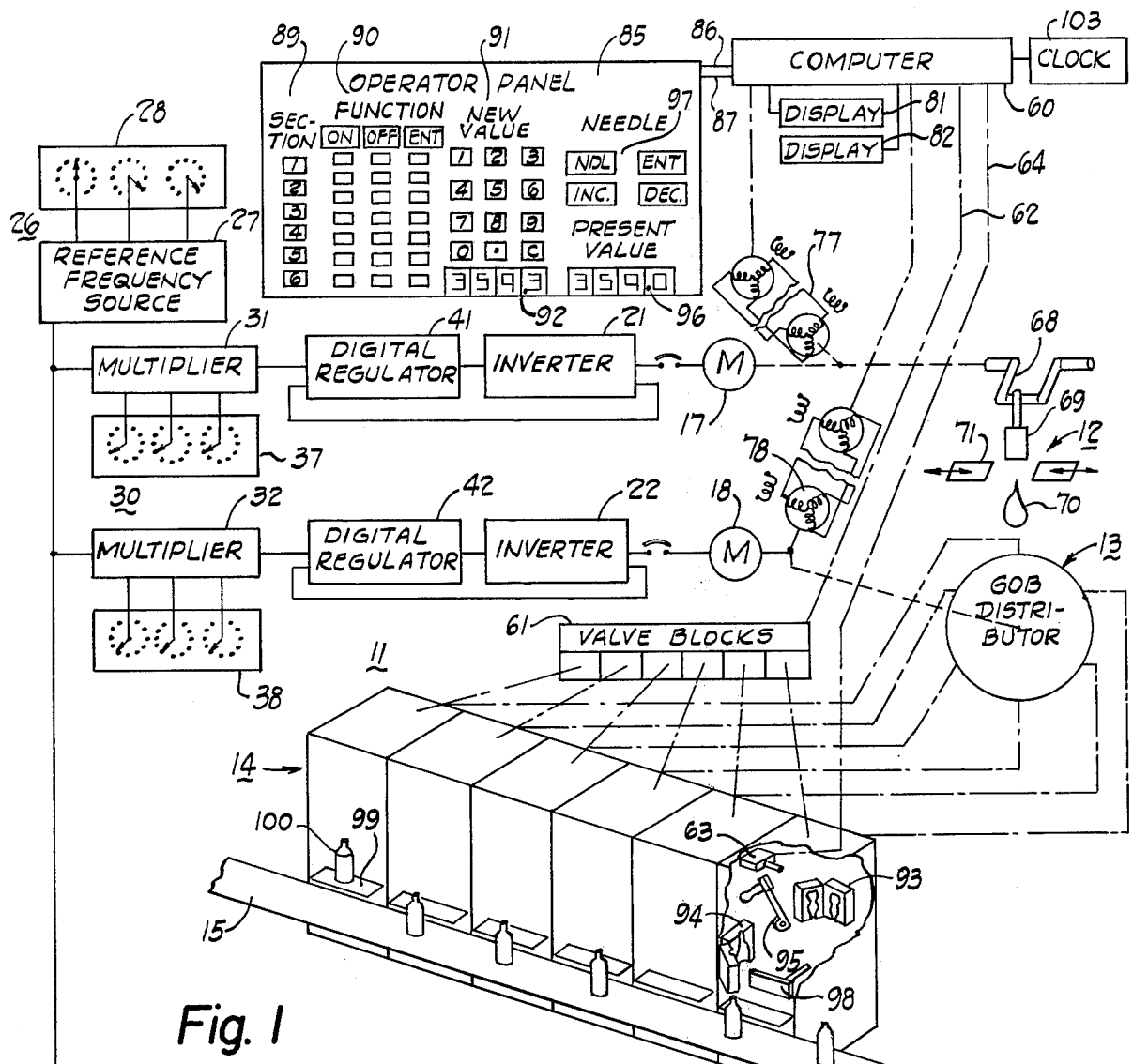
FIG. 1 is a schematic electrical and mechanical diagram of a glassware-forming machine embodying the invention.

The drawing shows a controllable individual section glassware-forming machine 11 which has as its general components a glass gob feeder 12, a gob distributor 13, a plurality of glassware-forming individual machine sections 14, and a take-off conveyor 15. The glassware-forming machine 11 is provided with individual drive motors 17, 18 and 19 which are used to drive the gob feeder, gob distributor and take-off conveyor 15, respectively. Individual variable frequency devices such as inverters 21–23 are connected to supply variable frequency to each of these drive motors 17–19, respectively. Frequency means 26 is provided to control the speed of the feeder 12, distributor 13 and conveyor 15. The frequency control means 26 includes a source of reference frequency 27 which is controlled by manual means 28 which in this preferred embodiment is a plurality of manual decade switches, such as thumb wheel switches, to manually vary the output frequency of the reference source 27. By changing the manual switches 28, this changes the output frequency, and hence, changes simultaneously the speed of all of the motors 17–20.

The frequency control means 26 also includes individual frequency control means 30 to control the output frequencies of the individual inverters to control the speed and relative timing position among the gob feeder 12, gob distributor 13, and take-off conveyor 15. The individual frequency control means 30 includes individual multiplier circuits 31–33 all connected to the reference frequency source 27 and each connected to a respective one of the inverters 21–23. Manual adjusting means 37–39 are connected to each of the multipliers 31–33, respectively, to vary the multiplication factors through a range of values. The manual means 37–39 in the preferred embodiment are manually adjustable switches such as decade switches, and, again, may be thumb wheel switches. Only three, three-decade switches are shown in each of the manual means 28 and 37–40. Yet, in the preferred embodiment, each switch has four or five multiposition sections for each unit in order to provide greater resolution and finer adjustment of the operating speed.

A plurality of digital regulators 41–43 are provided one for each of the inverters 21–23. All of the regulators 41–43 may be identical. The inverters 21–23 may be the type disclosed in U.S. Pat. No. 3,886,430, issued May 27, 1975, to Reliance Electric Company. The teaching of this patent is incorporated herein by reference.

The individual section glassware machine 11 is controlled by electronic control means such as a computer 60 in many of its functions. The individual sections 14 of the glassware machine are shown as being six in number, but they may be any number such as 1, 2, 4, 8, 10, or 12. Valve blocks 61 are provided, one for each of the individual sections 14, and they are connected to control the various functions or machine elements within each section. The valve blocks 61 are in turn controlled by the computer 60 on a digital output 62. Various control switches such as switch 63 are provided in each of the individual sections 14 and indicate actuation of each of the many machine elements. These are connected on a digital input 64 as an input to the computer 60. This digital input 64 is shown coming from only one of the sections, but it will be understood that this input receives input information from position, limit or control switches in each of the sections.

The gob feeder 12 is shown diagrammatically as including a crank 68 which is connected to reciprocate a ceramic plunger 69 to expel a gob 70 of molten glass from a forehearth which is sheared or cut by shears 71. Such glass gob falls to the gob distributor 13. Such gob distributor may be any of several types common in the industry. The gob distributor 13 is shown diagrammatically driven by motor 18 to distribute the gobs in a predetermined sequence to the individual sections 14.

Position transducers 77 and 78 are provided for the drive motors 17 and 18, respectively. These transducers may be of several types; and in the preferred embodiment are synchro-resolvers. Each pair has a rotor and a stator, and each pair has relatively rotatable single-phase and three-phase windings. The three-phase windings are inter-connected and the master rotor connected to the motor 17 generates a signal so that the slave rotor follows the rotation exactly. Such synchro-resolvers are commercially available with resolution of about one part in a thousand which is about one-third of a degree. The slave rotors have an output to the computer 60, and the shaft position may be displayed on suitable display devices 81 and 82 such as digital panel meters.

An operator panel 85 is provided and has an input 86 to and an output 87 from the computer 60. The operator panel 85 has a number of manually actuated switches with a first group 89 permitting an operator to select any one of the individual machine sections 14. A second switch group 90 permits the operator to select a particular machine function or more properly a machine element of the sections 14 which is to be controlled in its action. A third group of switches 91 selects a new angular value to be established for on or off of the selected function or machine element. This new value may be displayed on a panel meter 92. Each individual machine section 14 has a number of machine elements which are actuated, for example, a blank mold 93 and blow mold 94 to be opened and closed, an invert-revert arm 95 to move the parison from the blank mold to the blow mold, a push-off or sweep out arm 98, and each of these machine element movements should be initiated at a particular position or timing. The present value of such angular position may be displayed on a display meter 96 and to change it the new value is established by the third group of switches 91 and displayed on the display meter 92.

The velocity of movement of the various machine elements is also controlled by the electronic control means or computer 60 and the valve blocks 61 contain needle valves with adjustable apertures. Multiple needle valves may be used with each machine element and check valves may also control the flow of fluid to select the proper one or ones of needle valves. Thus, a machine element such as the invert-revert arm 95 may be caused to move rapidly for most of its travel and then be cushioned for a slow, precisely controlled deceleration and stop. A valve block actuating mechanism suitable for use with this invention is contained in the copending U.S. Patent application Ser. No. 602,245, filed Aug. 6, 1975, entitled Adjustable Valve Assembly, now Pat. No. 3,982,726, issued Sept. 28, 1976. A fourth group of switches 97 provides a way of putting in a time setting for the needle valves, which may be by many types of motorized valves. The time setting may be entered via the increase-decrease buttons which increase or decrease the time while being depressed, or may be entered via the new value switches 91, which, after the operation of the needle switch, serve to enter a time rather than an angular value.

The individual machine sections 14 have a dead plate or cooling plate 99 on which the glassware containers 100 are deposited after being formed in the blow mold 94. The sweep out or push-off arm 98 moves such containers from the dead plate or cooling plate 99 to the take-off conveyor 15. Movement of this sweep out arm is also controlled by the valve blocks 61 at a synchronized speed and position in accordance with the other machine element movements. The motor 19 drives this take-off conveyor at an appropriate speed to receive the containers 100 as they are pushed off the cooling plates 99. The take-off conveyor 15 may transfer the containers 99 to a cross conveyor, a star wheel, a conveyor in a lehr, a stacker mechanism, or a glassware-transfer mechanism. Such additional mechanisms may be added to the glassware machine 11, as needed or desired, and controlled by a motor and inverter similar to motor 17 and inverter 21. A clock 103 is connected to the computer to time various functions.

A reference frequency source suitable for the purpose intended is Reliance Electric Company part No. M/N 22C74. The multipliers may be Reliance Electric Company part No. M/N 22C73. The digital regulators may be Reliance Electric Company part No. M/N 22C72. The inverters may be Reliance Electric Company No. W/D 29454.

Figure 2:
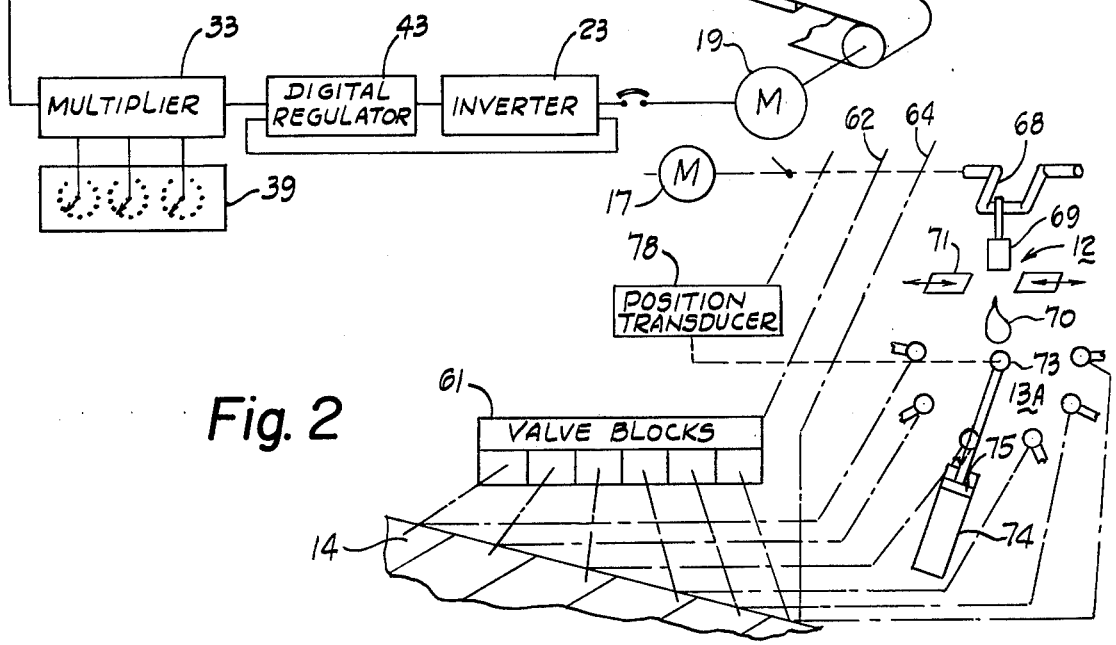
FIG. 2 is a partial view of a different gob distributor which may be used in the machine of FIG. 1.

FIG. 2 shows a partial view of an alternate gob distributor 13A which may be used with the glassware machine 11 of FIG. 1. The motor 17 drives the gob feeder 12 as before and the shears 71 cut the extruded glass to form the gob 70. The gob again falls by gravity to the gob distributor 13A which as a scoop 73 actuated by a cylinder 74 and piston 75 type of fluid actuator. There is one of these actuators for each section of the machine 14, shown as six in number. The scoop is moved from a retracted position to an extended gob receiving position in order to receive gobs in the predetermined sequence for each of the machine sections 14. In this case, the motor 18, inverter 22 and associated regulator and multiplier are not required to drive the gob distributor because the computer 60 controls the gob distributor via the valve blocks 61. The position transducer 78 may be retained if desired in order to give feedback information to the computer as to the precise timing position of the gob distributor 13A.

Figure 3:
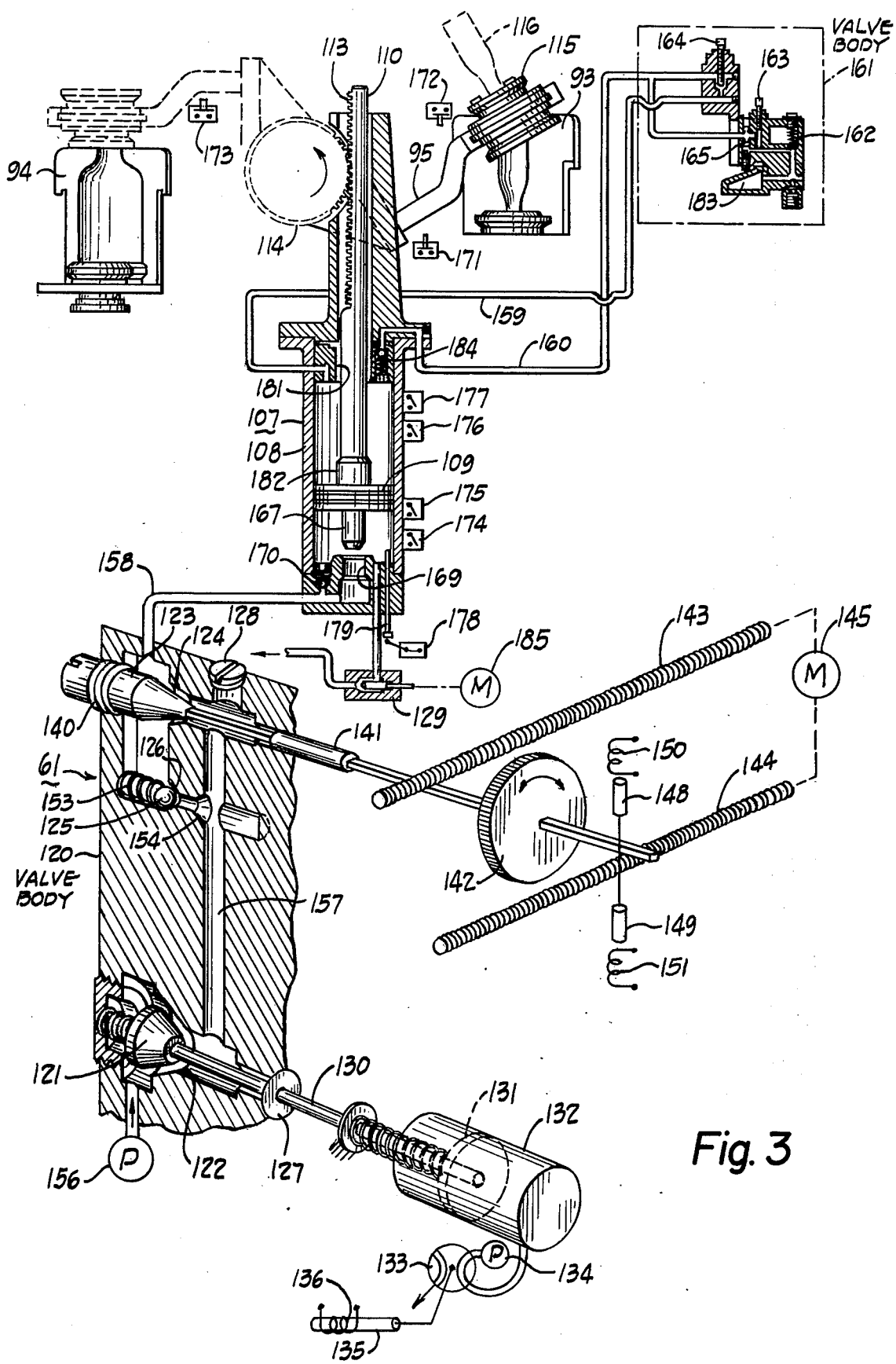
FIG. 3 is a diagrammatic mechanical and pneumatic diagram showing a portion of the valve and fluid motor mechanism.

FIG. 3 shows in greater detail a part of the valve blocks 61 and the pneumatic motor or actuator 107 which is representative of the pneumatic actuators controlled by the valve blocks 61. This pneumatic actuator 107 is shown as an expansible chamber motor including a cylinder 108 and a piston 109 therewithin. The piston has a piston rod 110 extending from the piston and is connected to actuate one of the many machine elements within the individual machine sections 14. Typically, there are 21 different main valves in the valve block 61 for control of about a dozen different machine elements in the machine 11. These various machine elements may be blank mold opening and closing, blow mold opening and closing, neck ring mechanism opening and closing, a sweep out arm to move the completed glassware from the cooling plate 99 onto the take-away conveyor 15, and the like. FIG. 3 illustrates that this pneumatic motor 107 actuates an invert-revert arm 95 as one example of such movable machine element.

FIG. 3 shows that this piston rod 110 has a rack 113 meshed with a pinion 114 to which the arm 95 is connected. This permits a 180° arcuate movement of this arm 95. A neck ring mechanism 115 is carried on the end of the arm 95 and opens and closes to grasp a parison 116 and move it from the opened blank mold 93 to the final blow mold 94. The molds 93 and 94 are merely representative of the type of molds used in the glassware-forming industry, and the blank mold 93 may be a press type or a blow type of mold, and the blow mold 94 permits admission of air under pressure to blow the parison into the final form of the glassware 100.

FIG. 1 shows the valve blocks 61 as being equal in number to the individual machine sections 14. Each valve block includes a number of valve bodies, and typically this may be 21 valve bodies in one valve block to control the many different machine elements, e.g., the invert arm 95. The lower portion of FIG. 2 shows just one of these valve bodies 120 which are connected together to make up one of the valve blocks 61. Each of the valve bodies 120 contains a main valve 121, a variable aperture valve 123, and a check valve 125. It also may contain a second needle valve or variable aperture valve 129. Each of these valves cooperates with a valve seat 122, 124, and 126, respectively. The details of construction of the valve bodies 120 are more fully described in a copending U.S. Patent Application of Arthur T. Bublitz and Eugene F. Holben, entitled Adjustable Valve Assembly, Ser. No. 602,245, filed Aug. 6, 1975, and the disclosure there of is incorporated herein by reference. Such application shows the details of a valve body which may be used in the present invention. For the purposes of the present invention on the controlled glassware-forming machine, the following description is presented. The main valve 121 is power-actuated as controlled by the computer 60. The main valve 121 is connected by a rod 130 to a spring loaded piston 131 inside a cylinder 132. A three-way valve 133 supplies a fluid, preferably air under pressure, to the outer end of the spring loaded piston 131 from a pressure source 134. The three-way valve 133 is actuated by a solenoid plunger 135 having a solenoid coil 136 connected for actuation by the computer 60. When the main valve 121–122 is actuated open by the solenoid, as shown, an exhaust valve 127 is closed. When main valve 121–122 is closed, exhaust valve 127 is open.

The variable aperture valve 123–124 is preferably a needle valve which has threads 140 so that rotation of the valve member 123 slowly moves the valve toward or away from the seat 124 to establish the variable aperture. A valve rod 141 is fixed to the valve 123 to rotate this valve, and the valve rod has fixed thereon a worm wheel 142. The worm wheel 142 is urged by springs, not shown, to the central position shown wherein it is out of engagement with each of two drive worms 143 and 144 which are constantly rotated in the same direction by a motor 145. Solenoid plungers 148 and 149 are actuated by solenoid coils 150 and 151, respectively, to urge the worm wheel 142 into engagement with the drive worms 143 and 144, respectively. The coils 150 and 151 are connected to be actuated by the computer 60. Since the drive worms 143 and 144 are capable of selective engagement with diametrically opposite portions of the worm wheel 142, they will impart either clockwise or counter-clockwise rotation to the valve rod 141 for either opening or closing movements, as desired. When the worm wheel 142 is not in engagement with either drive worm 143 and 144, the variable aperture valve 123 is accordingly stationary relative to its valve seat 124.

The valve body 120 also includes the check valve 125–126, and the valve 125 is shown as a ball engaging the valve seat under urging of a valve spring 153. The ball 125 and spring 153 may be removed and placed on the other side so that the ball will engage with a valve seat 154, if it is desired to have the check valve check the flow in the opposite direction.

The various valves are inter-connected by conduits to the pneumatic actuator 107, and, as shown, a pressure source 156, which may be the same as source 134, supplies fluid such as air under pressure through the main valve 121–122 to a conduit 157 to both the check valve 125–126 and the variable aperture valve 123–124. Since the assembly of the check valve, as shown, permits air flow in this direction, the check valve is urged open by the air pressure and the air flow need not pass through the variable aperture valve 123–124. From here it passes through a conduit 158 to the lower end of the cylinder 108.

It will be noted that the upper end of the cylinder 108 is connected by conduits 159 and 160 to a valve body 161 which may be identical to the valve body 120, and be one of the many valve bodies making up the valve block for that individual machine section 14. This valve body 161 has a main solenoid actuated valve 162, first and second variable aperture valves 163 and 164 and a check valve 165 for performing the same functions as the similarly designated valves in the valve body 120.

The pneumatic actuator 107 may be the self-cushioning type as shown wherein the piston 109 has a piston rod extension 167. When the valve body 161 is controlling air flow so that the piston 109 moves downwardly as viewed in FIG. 2, then air flows easily out of the exit conduit 158 until such time as the piston rod extension 167 enters a close-fitting bore 169. When this happens, air can no longer escape easily through this bore 169 and also cannot exit through a check valve 170 which opens only in the opposite direction. Air thus passes through needle valve 129 which cushions and slows the final motion of the piston 109, and hence, slows the final movement of the invert-revert arm 95.

A typical interconnection of the valve bodies 120, 161 and fluid actuator 107 utilizes the main valve 121 for the invert counterclockwise action of the arm 95 and utilizes the two needle valves 163 and 164 in the valve body 161. When main valve 121 is opened by the solenoid 136, air flows through the check valve 125, 126 through conduit 158 and check valve 170 to the lower part of the cylinder 108. This moves the piston 109 upwardly. Air escapes through the large bore 181, conduit 160 and needle valve 163 to an exhaust conduit 183, with needle valve 163 controlling the speed of movement of the arm 95. Now as the arm 95 approaches the blow mold 94, then the piston rod enlargement 182 closely fits within the enlarged bore 181 to close off air flow through conduit 160, because check valve 184 is also closed. Air flow is then through conduit 159 and the second needle valve 163 to provide a slow cushioned deceleration of the invert arm 95.

The computer 60 also may be timed to energize the solenoid actuated valve 162 just prior to completion of the invert cycle. This applies air pressure on the top of the piston 109 to counterbalance the air pressure on the bottom side and then the weight of the neck ring mechanism 115 and parison 116 will carry the parison to a soft, cushioned stop.

To establish revert movement the solenoid actuated main valve 121 is closed, and, since the main valve 162 is now open, this will force the piston 109 downwardly as controlled by first, the needle valve 123–124 and secondly by the needle valve 129 after the piston rod extension 167 is closely received inside the bore 169. Many other arrangements of needle valve and check valves are possible, and all of the needle valves may be motorized as shown by the motor 185 connected to actuate the needle valve 129.

The control switches 63 are shown in FIG. 1 as providing an input 64 to the computer 60. These switches may be limit switches or switches along the path of movement of a machine element. Such switches may be mechanical switches 171, 172 and 173 actuated by passage of the invert arm 95. Alternatively, they may be magnetically actuated switches 174–177 positioned along the cylinder 108 and actuated by the passage of a permanent magnet on the piston 109. A still further alternative is that these switches 63 may be control switches 178 actuated by control rods 179 extending into the cylinder 108 for actuation by the piston 109.

OPERATION

The operator has available to him the reference frequency source 27 which may be changed in value so as to establish the speed of operation of the entire machine 11. In the preferred embodiment the gob feeder 12 is the master to which all of the rest of the system is slaved. Accordingly, a reference frequency, for example, 50,000 hertz, might be set by the manual adjustable means 28. The multiplier 31 might be set at a value of 0.77777, for example, by means of the manual adjustable means 37. This would provide an output frequency of the multiplier 32 of 38,888 hertz which would establish an appropriate speed of the motor 17. The inverters 21–23 are capable of smooth change of frequency from a minimum speed up to full speed of the motor e.g., 1,800 RPM. The change of the manual means 28 permits change of speed of the entire system, and the change of one of the manual means, 37 for example, will change the frequency to the motor 17, and, hence, change the phase or timing position of the gob feeder 12 relative to the remaining parts 13–15 of the machine 11. By this means the speed and positional phase of the various portions of the machine may be controlled. The digital regulators 41–43 provide regulated output to the inverters 21–23, so that synchronization of all parts of the machine may be assured.

Each of the individual machine sections 14 have fluid motors connected to move the various machine elements of each individual section. The valve blocks, one for each machine section, contain a plurality of valve bodies each connected to control movement of various machine elements within each machine section 14. Control switches 63 such as those shown in FIG. 1 and the switches 171–178, FIG. 2, are actuated by movement of the various fluid motors. Finally, the computer 60 has inputs from the various control switches and has outputs connected to control the valve means to control the time and velocity of actuation of the various machine elements of each individual section, and to control the gob distributor 13A of FIG. 2.

Often two main or on-off valves will work in conjunction with a single fluid motor to control the forward and reverse motion. This is illustrated by the invert-revert arm 95 shown in FIG. 3. In such case the valve bodies 120 and 161 work together to provide the invert and revert movements. Such mechanism often differs with different glass machine manufacturers, and the above description of FIG. 3 is a typical composite of such machines. The gob 70, distributed by the gob distributor 13 to one of the machine sections 14, will be directed by a funnel mechanism, for example, to the blank mold 93. Here one of the valves in the valve blocks 61 will control air flow to settle or force the gob to the bottom of the blank mold. Another valve might control a plunger which moves upwardly into the gob of glass to force it outwardly into a rough parison. This would be in a press-blow machine. Alternatively, one of the valves might control air pressure to force air upwardly into the gob of glass in the blank mold to blow it outwardly into a parison. This would be a blow-blow type of machine. Next, another valve body would control the opening of the blank mold. Still another valve would control the neck ring mechanism 115 to close this mechanism on the neck of the parison, ready for the invert-revert arm 95 to move the parison to the blow mold 94.

As outlined above, there may be two main valves to control actuation of an element such as arm 95; and there are on and off settings for each of these valves. Also, two needle valves and as many as four needle valves are used for control of each machine element, so this provides six to eight controllable items on one machine element. These many adjustments used to be performed by the craftsman operating the machine 11 and now may be much more precisely controlled by the computer 60.

The computer 60 will scan through a number of inputs until it has completed scanning all of these inputs and will then repeat. This continues for as long as the machine 11 is in operation, and such scanning is done at a rapid rate, for example, in one millisecond or less. One of the inputs scanned by the computer is the then current distributor position from the position transducer 78. The computer scans a table of on and off conditions for the various main valves 121–122. The computer would scan the table and might find that at angle of 23.5°, for example, the invert arm 95 should start to move. This would give a signal to the main valve 121 to be opened. More specifically, it would give a signal to energize the solenoid coil 136 to move the three-way valve 133, and, hence, pressure would be applied to the piston 131 to move it to the left as viewed in FIG. 2. This would open the main valve 121–122 and simultaneously close conduit 157 to exhaust by means of closing of the exhaust valve 127 on the valve rod 130. Operation air would, therefore, be supplied by the pressure source 156 through the main valve 121–122, through conduit 157, through the check valve 125 to the cylinder 108. This would move the piston 109 upwardly, thus causing the invert-revert arm 95 to move in a 180° arc from the 3 o'clock position counter-clockwise to the 9 o'clock position. This would move the parison 116 from the blank mold 93 to the blow mold 94. This movement of the invert arm 95 is an example of one which requires timed travel. This is because during the transfer from the blank mold to the blow mold, the skin of the parison is reheating from the internal heat of the parison. If the invert movement is too slow, the parison will sag downwardly due to gravity. If the invert movement is too fast, the parison will be thrown outwardly by centrifugal force. Careful adjustment of the needle valve 163 must be made to allow for the weight, viscosity, and shape of the parison. Also, it will be noted that the parison is upside down in the blank mold and in the first half of its travel, and it is rightside up in the last half of its travel toward the blow mold. Accordingly, reheating of the parison in the first half of the travel allows the parison to sag, and reheating on the last half of the travel allows the parison to run. The two effects have to be counterbalanced for a proper invert motion.

This timed travel of the invert arm 95 may be the entire 180° as timed between the switches 171 and 173 or between switches 174 and 177. Alternatively, the timed travel may not start until the arm has moved about 45° whereat it will have cleared the blank mold 93 so that the blank mold may be made ready for the next gob of glass. In such case the timed travel might be only about 135° between switches 172 and 173 or between switches 175 and 177. If this timed travel is desired, as in the example for the invert arm 95, then the computer would read the clock at the start and the end of the travel times, as determined by the actuation of the appropriate switches. When the second switch is clocked, the computer would scan a table of desired travel times to compare it with the actual travel time and subtract for the difference value. If this actual travel time does not agree with the desired travel time from the table in the computer, then a status flag will be set by the computer, and the needle valve actuating mechanism will come into play. The status flag indicating that a change in needle valve setting is required, is set when this difference value exceeds a certain predetermined amount. The needle valve is adjusted in accordance with this difference value. The computer will energize the solenoid coil 150 or 151 depending on whether the needle valve should be actuated more toward the open or more toward the closed position. The constantly running motor 145 will drive the worms 143 and 144, and whichever is engaged with the worm wheel 142 will drive the needle valve in the appropriate direction. This takes a certain finite time to provide the required adjustment, for example, this might be two seconds. Since the computer scans through all of the inputs in a much shorter time than this, one of the inputs scanned by the computer is whether or not a status flag has been set indicating that a previous adjustment is still in progress. In this case where a status flag has been set, it would give information to the computer showing that such adjustment was in process so that no further input commands to the solenoids 150 or 151 for that valve body 120 would be given by the computer 60 until such adjustment had been completed. Many glassware-forming machines give such option to the operator to be able to select either controlled throttling of air into the piston by the needle valve or controlled cushioning of the air out of the cylinder by another companion needle valve.

Figure 4:
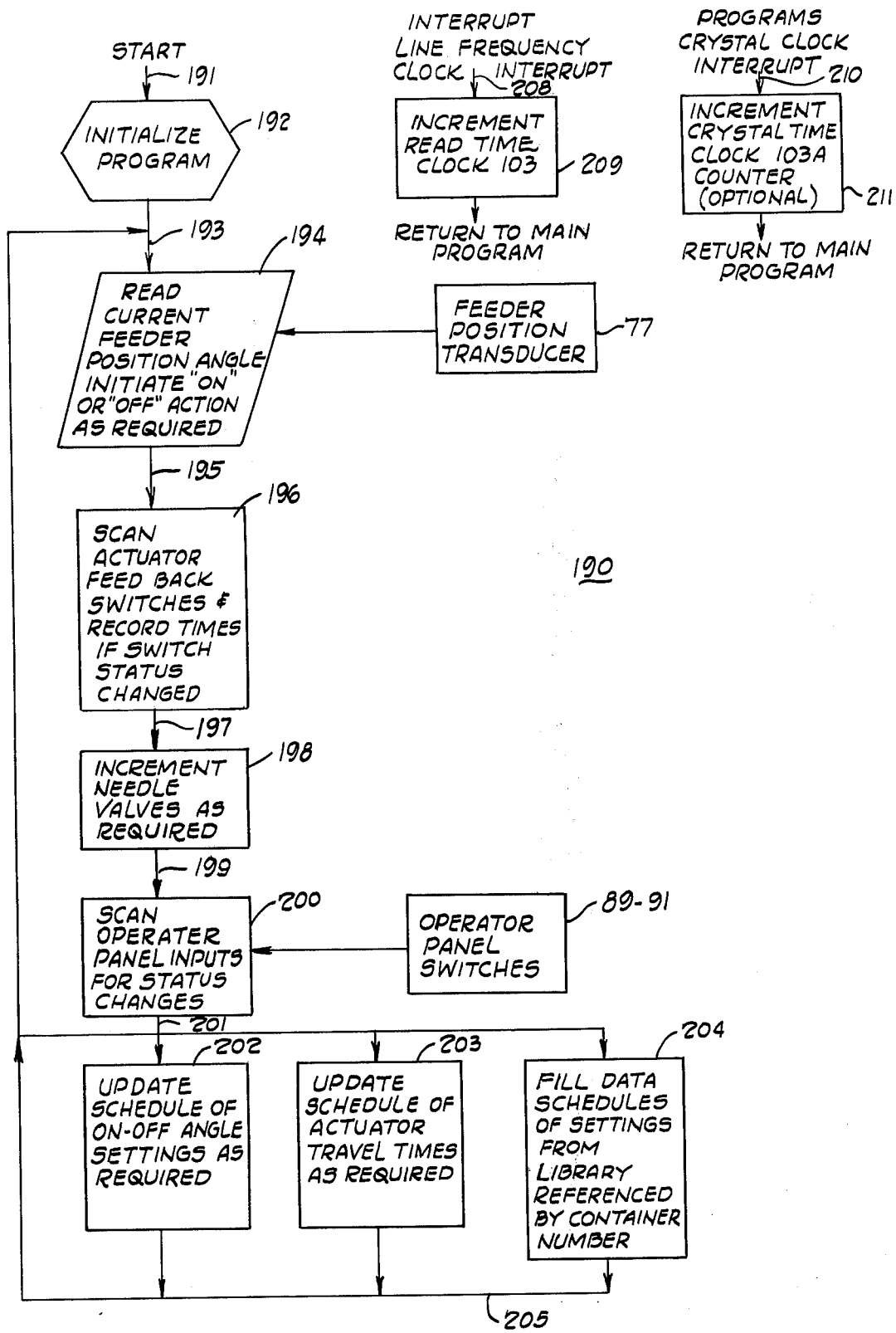
FIGS. 4–8 are flow diagrams of the scan sequence in the electronic control.

The FIG. 4 is a flow diagram of the scan sequence of the electronic control or computer 60. FIG. 4 shows the entire flow chart or program 190, and FIGS. 5–8 show additional details of the blocks shown on the flow chart of FIG. 4. The scan of the information in the computer 60 takes place in a very short time, e.g., one millisecond and follows downwardly through the various blocks as shown by the flow line 191 and the arrows thereon. Block 192 indicates that the scanning is started or the program initialized. The scan passes from output 193 of block 192 to a block 194 whereat the current feeder position angle is read from the position transducer 77 and on or off action of a main valve is initiated as required. The scan passes through output 195 to a block 196. In this block the computer scans the actuator feedback switches and records the time if the switch status has changed. This scan passes through output 197 to a block 198 whereat incremental adjustment of the needle valves is performed as required. The scan passes through output 199 to a block 200 whereat the computer scans the operator panel switches for any status changes. The scan passes through output 201 to a group of paralleled blocks 202, 203, and 204. At block 202 the schedule of on-off angle settings is updated as required. At block 203 the schedule of actuator travel times is updated as required. At block 204 the data schedules of settings are filled from a library referenced by the designation number of the glassware container being manufactured. The output 205 of these blocks 202–204 returns to the input of block 194 for a continuous scanning over and over again of the various blocks.

The FIG. 4 also shows that the flow chart 190 includes interrupt program capability with an input 208 to a block 209 whereat the real time clock 103 may be incremented. Thereafter, the scan returns to the main program. Another interrupt program is provided at input 210 to a block 211 whereat the crystal time clock 103A is incremented. This block 211 includes an optional counter, and then the scan will return to the main program.

Figure 5:
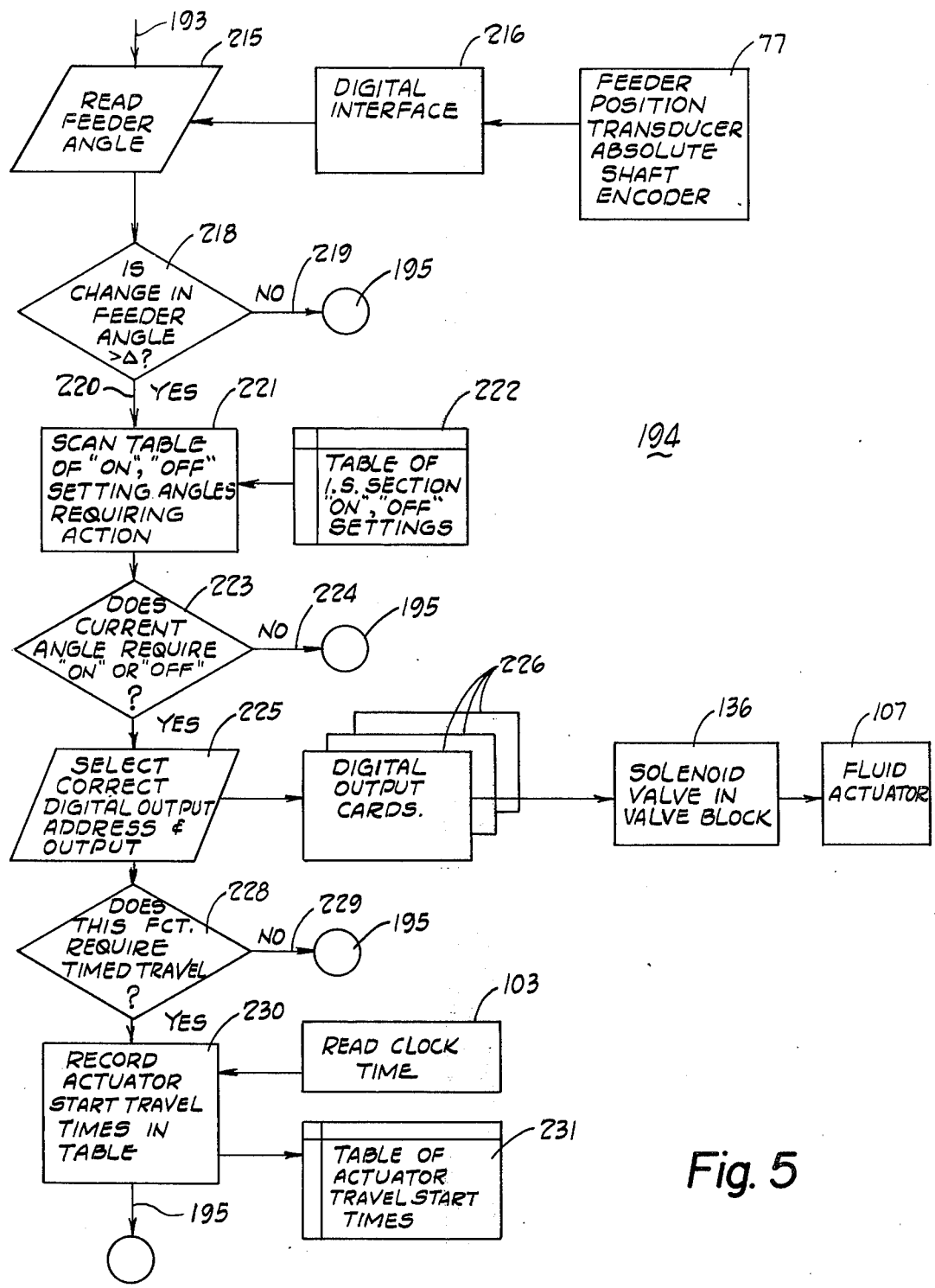

FIG. 5 shows a more detailed scan sequence within the block 194 of FIG. 4. This expanded block 194 shows that the scan is from the output 193 of the program initializing block 192 and scans through an input block 215 where the computer reads the current feeder position angle as obtained from the feeder position transducer 77 through a digital interface circuit 216. Next, the scan passes to a question block 218 wherein the computer questions whether the feeder angle has changed more than the given delta angle. This delta angle might be one-half or one-tenth of a degree, for example. There is little point in trying to change a setting to any closer resolution than this; and since the scan through the entire program is so rapid, there may be a change of feeder angle of only 1/100 of a degree, for example, between scans. If the answer to this question is no, then the scan passes on a line 219 directly to the output 195 of this block 194. If the answer is yes, then the scan continues on a line 220 to an action block 221 wherein a table 222, stored within the computer and of individual section on and off settings, is scanned to determine those angles at which action is required. The scan next passes to a question block 223 whereat the question is asked whether the current angle position requires an on or an off. If the answer is no, the scan passes through a line 224 directly to the output 195 of block 194. If the answer is yes, the scan passes to an output block 225. In this block there is selected the correct digital output address and output, and an output signal is supplied to digital output circuits 226 which may be on printed circuit cards and which in turn control the appropriate solenoid actuated valve in the valve block. This may be solenoid 136, for example, and it in turn controls the fluid actuator such as actuator 107.

The scan next passes from block 225 to a question block 228 whereat the question is asked whether this particular function or machine element requires timed travel. If the answer is no, then the scan passes on a line 229 directly to the output 195 of block 194. If the answer is yes, the scan passes to an action block 230 whereat an input from the clock 103 is recorded in as an actuator start travel time with this recording being in a table 231. It will thus be seen that block 194, as expanded in FIG. 5, incorporates the necessary circuit functions to read the current feeder position angle and initiate the proper on or off action of main valves as required.

Figure 6:
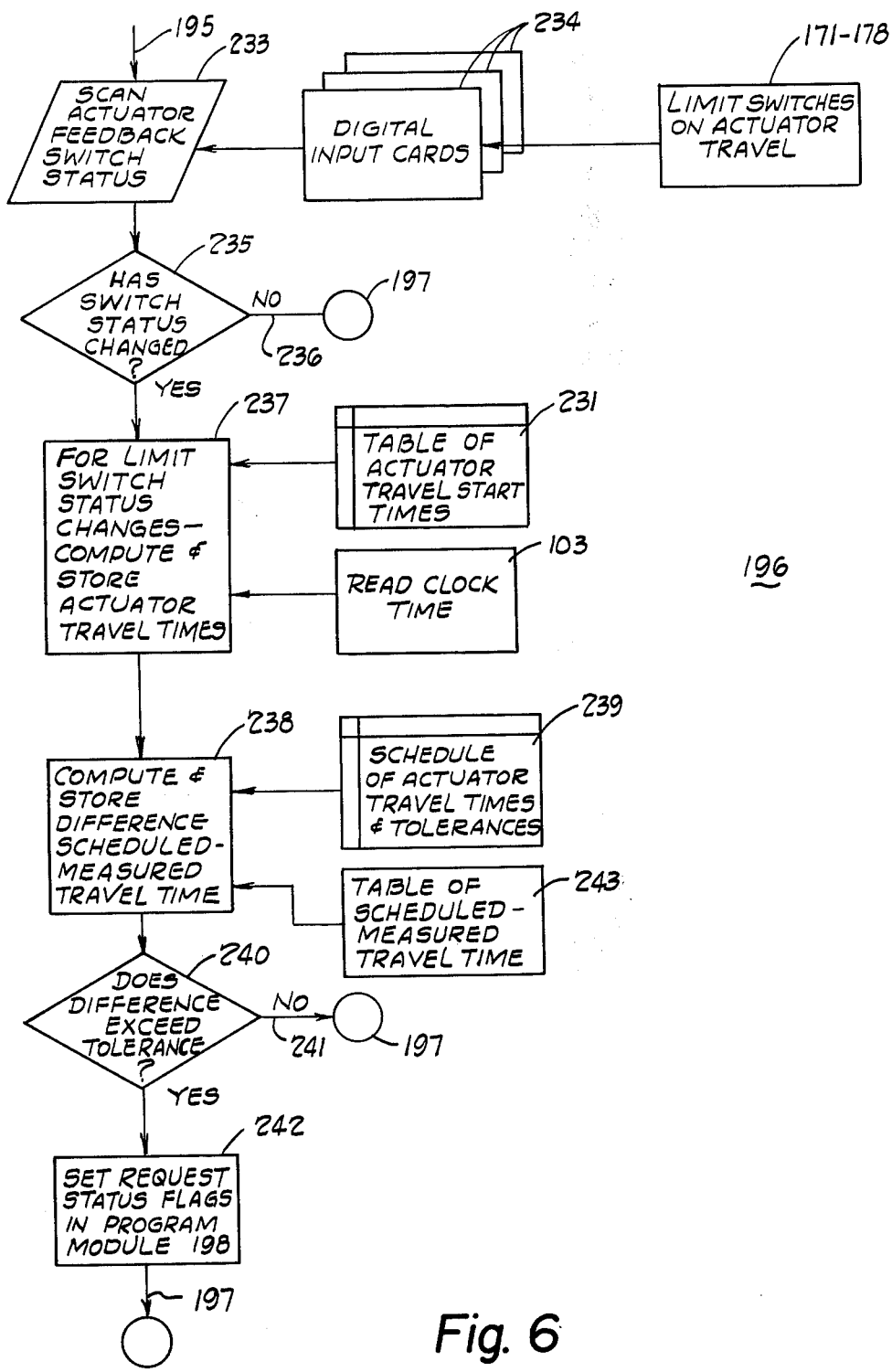

FIG. 6 shows in greater detail the flow chart or scanning sequence within the block 196 of FIG. 4. The input to the block 196 is from output 195 of block 194 and goes to an input block 233 whereat the actuator feedback switches such as switches 171–178 are scanned as to status. These limit or control switches may be connected through digital input circuits 234, as required. The scan next passes to a question block 235 which queries whether the switch status has changed. If the answer is no, the scan passes on a line 236 directly to the output 197 of the block 196. If the answer is yes, the scan passes to an action block 237 whereat the time is read from the clock 103 and the table 231 of actuator start times, as recorded in block 230, is scanned in order to compute and store the actuator travel times. The scan next passes to an action block 238 whereat a schedule of actuator travel times and tolerances 239 is scanned and there is computed and stored in a table 243 the difference between the scheduled and the measured travel times. The scan next passes to a question block 240 whereat the question is asked whether the difference exceeds a predetermined tolerance period. If the answer is no, the scan passes on a line 241 directly to the output 197 of block 196. If the answer is yes, the scan passes to an action block 242 whereat a request status flag is set in the block 198 of FIG. 4. It will thus be seen that the block 196 of FIG. 6 shows a scan sequence sufficiently detailed to show how the actuator feedback switches are scanned and times recorded if a switch status has changed.

Figure 7:
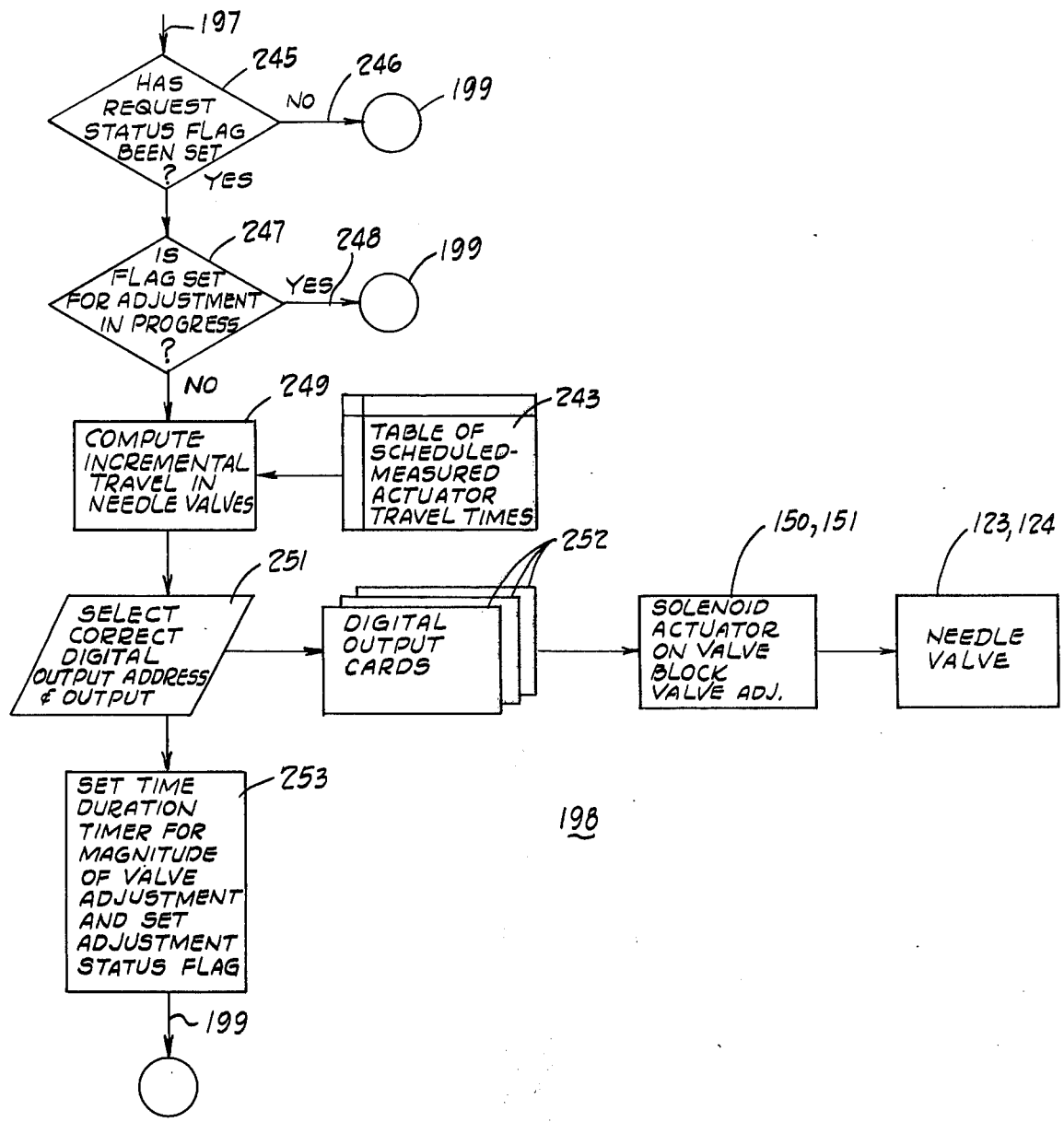

From the output 197 of FIG. 6, the scan passes to block 198 of FIG. 4, and the details thereof are shown in FIG. 7. The scan passes to a question block 245 whereat the question is asked whether a request status flag has been set. As outlined above, the setting of a request status flag indicates that an actuator travel time is out of tolerance requiring adjustment. If the answer is no, the scan passes directly on a line 246 to the output 199 of block 198. If the answer is yes, the scan passes to another question block 247 whereat the question is asked whether the flag has been set for an adjustment in progress. A previous request for adjustment of the needle valve may still be in progress because such adjustment takes a long time in comparison to one complete scan cycle. If the answer is yes, the scan passes directly to a line 248 to output 199 of block 198. If the answer is no, the scan passes to an action block 249 whereat the table 243 of scheduled-measured travel times is scanned and the incremental travel in the needle valves is computed. The scan next passes to an output block 251 wherein there is selected the correct digital output address and output, an output signal passes through digital output circuits 252 to the designated solenoid actuator on the valve block needle valve adjustment such as solenoid 150 or 151 and this actuates the respective needle valve such as needle valve 123, 124. The scan next passes to an action block 253 whereat the time duration timer for the magnitude of valve adjustment is set. This time duration corresponds to the magnitude of the valve adjustment required. Also, an adjustment status flag is set to show that a needle valve adjustment is in process. This FIG. 7 shows that the block 198 has the proper blocks or modules to increment the needle valves as required if an actuator travel time is out of tolerance.

Figure 8:
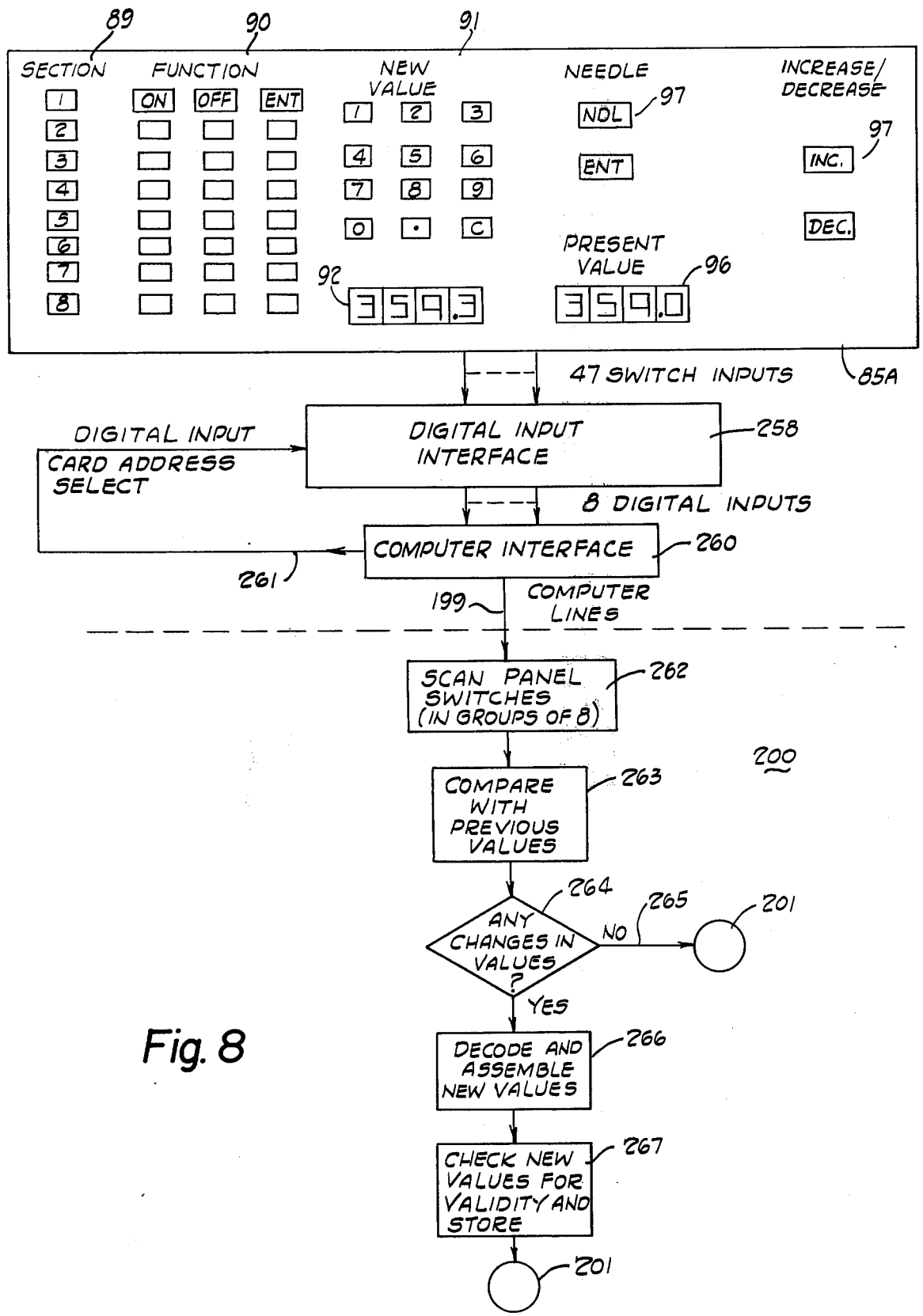

FIG. 8 shows in more detail the block 200 shown in FIG. 4. This module scans the operator panel inputs for status changes. A typical operator panel 85A similar to operator panel 85 of FIG. 1 is shown at the top of FIG. 8. The various switches on the operator panel 85 are shown in this case as being 47 in number, and they appear on line 257 as an input to a digital input interface module 258. This module has an output of eight digital inputs on lines 259 to a computer interface module 260. Feedback on a line 261 provides a digital input to the digital input interface module 258 of a card address select function which selects a sub-group of eight inputs. The aforementioned modules in FIG. 8 are hardware items, and the scan from the output 199 of block 198 of FIGS. 4 and 7 now passes to the block 200, which is explained in more detail in the lower part of FIG. 8. This scan passes to a block 262 whereat the operator panel switches are scanned in groups of eight. The scan next passes to a block 263 whereat these panel switches are compared with previous values. The scan next passes to a question block 264 whereat the question is asked whether there is any change in values. If the answer is no, the scan passes on a line 265 directly to the output 201 of block 200. If the answer is yes, the scan then passes to a block 266 whereat the value is decoded and new values are assembled. The scan next passes to a block 267 whereat the new values are checked for validity and are stored. These new values are stored in the table 222 of individual section on and off settings, shown in FIG. 5; and the schedule 239 of actuator travel times and tolerances shown in FIG. 6, as examples. It will thus be seen that FIGS. 4–8 show a scan sequence performed in the electronic control means or computer 60 so that the individual section machine 11 may be precisely, rapidly, and easily controlled in complete safety to the operator.

The operator can watch the sequence of operations of each of the individual machine sections 14. If one of the parisons is not being properly moved, for example, from the blank mold to the blow mold, such operator has available to him the means to change the travel time. The operator merely selects the proper one of the six individual machine sections by pressing the correct push-button switch 89. Next, he selects the proper one of the 21 different functions or machine elements by selecting the proper switch 90. Next, he presses the on or off switch in this group. Next, he can observe the present value which will be displayed on the display meter 96, and this is shown in FIG. 1 as being 359.0° as an example. If he now desires that function to start slightly later in time, for example, at 359.3°, he presses the approximate new value switches 91, and such new value will be displayed on the display meter 92. Next, he presses the "enter" switch, and this will change the input to the computer 60 so that on the next operation of that machine section, the particular machine element will not be actuated at 359.0°; instead, it will be actuated at 359.3°. This is a far safer method of changing the machine timing than in the prior art which required the operator to use a wrench to move on and off buttons around the periphery of a timing drum. Often only 90° to 120° of the periphery of the timing drum was available to the operator; and while such timing drum was moving at its maximum rate, such on and off buttons would be available for only about one second of time. For an operator to loosen the button by twisting a wrench and then to move the button a few degrees along its slot and retighten the button all within this short span of time was extremely dangerous to the operator. Many fingers have been lost or mangled by such timing drums. The Federal Government has become increasingly concerned over the safety of operators on machinery and this present control system permits the operator to change the timing from a remote point and with complete safety.

Also, the operator need not adjust the needle valve manually. Instead, he may adjust it from a remote position at the operator panel 85. The selected section and function switches 89 and 90 would be actuated, then the "needle" switch would be actuated. Two alternatives are now present. The first is that the appropriate increase or decrease switch next would be maintained depressed until the desired new time value appeared at meter 92. The second alternative is that the new value switches 91 would be used to select, not an angular value, but a new time value, and then actuation of "enter button would enter this new value in the computer 60. These alternatives would change the needle valve setting by actuating the appropriate solenoid coil 150 or 151 so that the motor 145 would drive the needle valve open or closed.

In new or recently rebuilt machines the amount of backlash in the machinery is usually not significant; but as the machines wear, the amount of backlash does become significant and often intolerable. Accordingly, it becomes increasingly difficult for the operator to have each of the several sections produce uniformly acceptable glassware. Even though all machine sections were set exactly alike, there would still be individual variations in the glassware formed because of the variations among the machine elements and the wear on these parts. In the prior art system, the operator had the difficulty of trying to compensate for these variations among the machine sections to try to obtain repeatability. The mechanical adjustments of the on and off buttons on the timing drum and the needle valve settings were the principle adjustments which the operator had available for trying to make uniformly acceptable glassware. In the present invention, the control of the machine sections 14 is by the computer 60 with tables of values stored therein for each of the machine sections. These values may be changed at will by the operator through the operator panel 85 with the new values stored in the table. This permits easy changeover of one type of glassware to another. When the molds are changed to form 12-ounce beer bottles instead of half-gallon milk jugs, for example, the new program is inserted into the computer 60 and the old program is stored until the milk jugs are again formed by the machine 11. This makes for a rapid changeover from one type of glassware to another and with a much greater productivity as soon as the machine comes up to operating temperature. With the position transducers 77 and 78 having a resolution accuracy of about 1 in 1,000 namely, about one-third of a degree, this is a much finer resolution than the old system of moving the on or off buttons about 3° to 10° along the slot in the timing drum. With this finer resolution, it is much easier to achieve close uniformity among glassware produced by each of the machine sections 14.

The position transducers 77 and 78 taken together, provide information as to the relative angular position of the various parts of the machine 11. Accordingly, the positional phase of the gob feeder 12 and gob distributor 13 may be adjusted relative to the plurality of individual sections 14 by temporarily changing on a manual or automatic basis the frequency setting on the dividers 37, 38, and 39.

The manufacture of glassware, simply stated, is the controlled removal of heat in a sequence of glass delivery and forming operations. Much of this heat is removed by cooling air blowing on the various machine elements and on the parison. The cooling air is ambient air which varies in temperature between winter and summer. Accordingly, in the prior art systems the operator had to take this varying temperature of the ambient cooling air into consideration. With the present computer-controlled system, this variation in the removal of heat is much more readily taken care of.

The temperature of the ambient air affects many things, primarily the temperature of the cooling air. It also affects the amount of radiation because of the environment of the machine surrounding the blow molds and parison. It also changes the mechanical tolerances and, hence, friction. Hence, the speed of the arm will change. Accordingly, in the computer 60 there may be stored in block 243 alternate values for winter and summer timing functions to control the cooling air. Also, by measuring the travel time of various machine elements, this automatically controls the machine functions for those functions or elements affected by the cooling air.

The computer control has another advantage in simplifying the set up by the operator for a new set of molds to form a new type of glassware. Once one of the individual sections 14 has been set and running properly, the machine settings plus an offset position, for example, 60°, may be transferred to the other machine sections. Still further, the machine settings for up to 100 different product types can be loaded from the settings used the last time that product type was run or from the table of set up values. The present computer control has definite advantages of improved productivity of the individual section machine 11. It will permit de-skilled operation because there is much less "art" involved in obtaining a highly productive machine. Also, the entire production of glassware is much more repeatable which is achieved through feedback measurements rather than relying so heavily upon a skilled operator to observe the operation and make mechanical adjustments.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A controlled glassware-forming machine comprising, in combination:
   a plurality of individual machine sections each having means to individually form glassware,
   fluid actuators connected to move the various machine elements of each individual section,
   a plurality of variable aperture valve means connected in fluid communication with said fluid actuators and each connected to control the velocity of movement of said fluid actuators of the glassware-forming machine,
   control switches actuated in accordance with movement of said fluid actuators,
   control means having inputs from said control switches and having outputs,
   said control means having presettable means to establish preset times of travel of various ones of the machine elements and having comparison means to compare the preset time and the actual time of travel of various ones of the machine elements,
   and said outputs of said control means connected to control the variable aperture of said valve means to control the velocity and time of actuation of various ones of the machine elements of each individual section.

2. A glassware machine as set forth in claim 1, including means to sense the speed of operation of said machine sections, and an input to said control means from said speed-sensing means.

3. A glassware machine as set forth in claim 1, including a glass gob feeder to feed gobs of molten glass,
gob distributor means to distribute the gobs to the individual sections of the machine in a predetermined sequence,
a position transducer determining the angular position of one of said gob feeder and gob distributor means,
and an input to said control means from said position transducer.

4. A glassware machinee as set forth in claim 3, wherein said position transducer is connected to said gob feeder.

5. A glassware machine as set forth in claim 3, wherein said position transducer is connected to said gob distributor.

6. A glassware machine as set forth in claim 1, wherein said presettable timed travel establishing means includes a clock,
means to read said clock at the start of timed travel,
and means to read said clock at the end of said timed travel.

7. A glassware machine as set forth in claim 6, wherein said presettable timed travel establishing means includes means to scan a table of desired travel times,
and said comparison means compares the actual and the desired travel times to obtain a difference value.

8. A glassware machine as set forth in claim 7, wherein said control means includes means to set a status flag upon said difference value exceeding a predetermined value.

9. A glassware machine as set forth in claim 8, wherein said control means includes means to control the amount of said variable aperture in said valve means in accordance with the length of time that said status flag has been set.

10. A glassware machine as set forth in claim 1, including means in said control means actuating said control switches in accordance with only a portion of the total travel of said fluid actuators to establish a timed travel for only said portion of total travel.

11. A glassware machine as set forth in claim 1, including first and second of said valve means controlling fluid flow in opposite ends of one of said fluid actuators to establish opposing forces to movement of a machine element over a portion of the travel thereof.

12. A controlled glassware-forming machine comprising, in combination:
a plurality of individual machine sections each to form glassware,
fluid motors connected to move the various machine elements of each individual section,
a plurality of variable aperture valve means connected in fluid communication with said fluid motors and each connected to control the velocity of movement of a machine element of the glassware-forming machine,
control switches actuated in accordance with movement of said fluid motors,
and a computer control having inputs from said control switches and having outputs,
said computer control having presettable means to establish preset times of travel of various ones of the machine elements and having comparison means to compare the preset time and the actual time of travel of various ones of the machine elements,
and said outputs of said computer control connected to control the variable apertures of said valve means to control the velocity and relative timing of various ones of the machine elements of each individual section.

13. A glassware-forming machine as set forth in claim 12, including power means selectively actuable and connected to said valve means to vary the apertures therein.

14. A glassware-forming machine as set forth in claim 13, wherein said power means includes a reversible power train selectively actuable to open and to close said variable aperture valve means.

15. A glassware-forming machine as set forth in claim 12, wherein said presettable timed travel means includes a clock timing the travel of a machine element between two of said control switches,
and said comparison means comparing thee clock-timed travel against a preset time.

16. A glassware-forming machine as set forth in claim 15, wherein said computer includes means to scan a table of desired travel times to determine said preset time.

17. A glassware-forming machine as set forth in claim 12, including storage means in said computer control to store alternate values selectively available for control.

* * * * *